Figure 1:
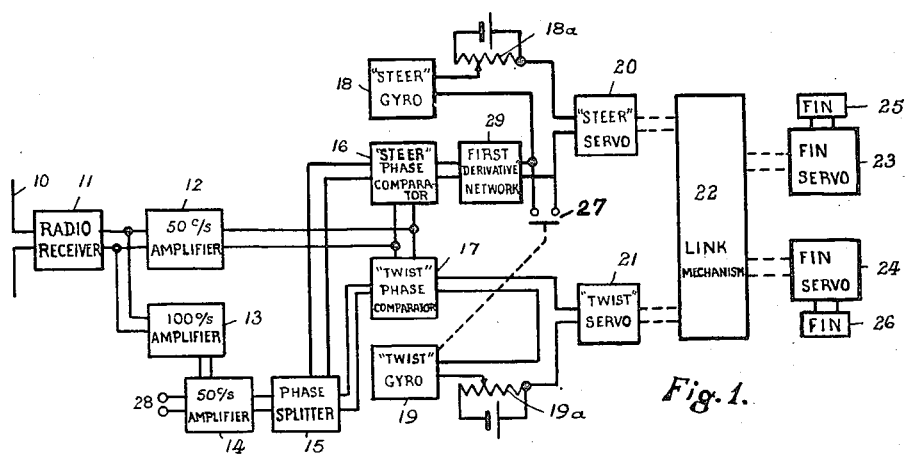

Nov. 4, 1952 — L. H. BEDFORD ET AL — 2,616,640
RADIO NAVIGATION SYSTEM
Filed March 22, 1945 — 2 SHEETS—SHEET 1

INVENTORS
Leslie H. Bedford
Lionel Jofeh
By Ralph B. Stewart
Attorney

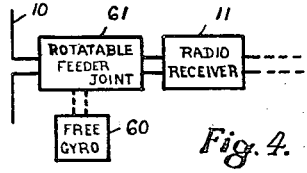
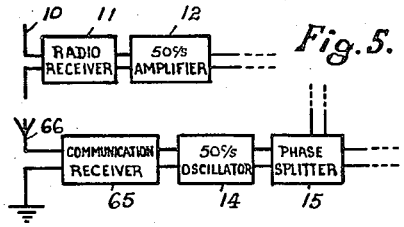
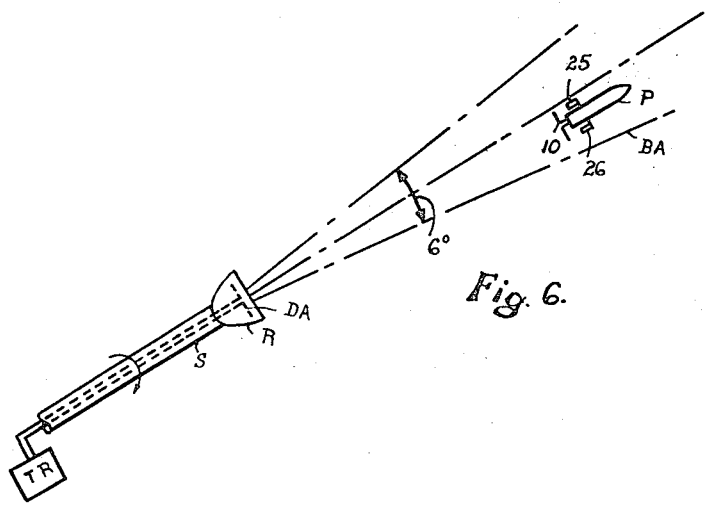
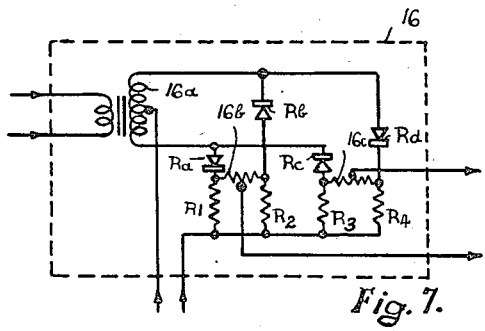

UNITED STATES PATENT OFFICE 2,616,640

RADIO NAVIGATION SYSTEM

Leslie Herbert Bedford and Lionel Jofeh, London, England, assignors to A. C. Cossor Limited, London, England, a British company Application March 22, 1945, Serial No. 584,130
In Great Britain April 14, 1944

8 Claims. (Cl. 244—77)

This invention relates to the automatic production of a response representing the position of a body in space relative to a radio beam. It is particularly applicable to the automatic control of the direction of flight of a body by means of a radio beam.

One feature of the invention is the use for this purpose of a radio beam, the direction of maximum intensity of which is caused to sweep out or scan, at constant angular velocity, a conical surface of small apical angle.

The body will be situated within the swept cone, and a radio receiver on the body will then pick up from the beam a signal having a component of amplitude modulation at the frequency of the conical scanning. The amplitude of this modulation, and its phase relative to that of the sweep or scan of the transmitted beam, will represent respectively the magnitude and the direction of the displacement of the body from the cone axis around which the beam sweeps or scans.

A further feature of the invention is the use of a polarized radio beam having its plane of polarization rotating at constant angular velocity. A body situated in the beam, and provided with a radio receiver having an aerial system which is sensitive to plane of polarization, will then pick up from the beam a signal having a component of amplitude modulation having twice the frequency of this rotation. The phase of this signal relative to that of the rotating polarization of the transmitted beam will represent the rotational attitude of the body relative to that of the transmitter.

In carrying the invention into effect by the combination of the two said features, a polarized radio beam is employed, and its direction of maximum intensity is caused to sweep out or scan, at constant angular velocity, a conical surface of small apical angle, while its plane of polarization rotates synchronously with the conical scanning.

Assume that the body is flying within the swept or scanned cone in a direction at least nearly parallel to the cone axis, and that the angular velocity of rotation of the receiving aerial system about the instantaneous direction of flight of the body is zero or low in comparison to the angular velocity of scanning of the beam. The received signal will have components of amplitude modulation both:

(a) At the sweep-frequency, the amplitude of this modulation component increasing with increase of magnitude of the displacement of the body from the axis of the swept cone, and its phase displacement relative to the transmitter scan being dependent on the direction of the displacement of the body from the cone axis of the scanning beam.

(b) At twice the scan-frequency, the phase displacement of this modulation component relative to the transmitter scan being dependent on the rotational attitude of the receiving aerial system, but being substantially independent of both the direction and magnitude of the displacement of the body from the cone axis of the scanning beam.

The expression "phase displacement" relative to an oscillation of scan-frequency, applied to an oscillation of twice scan-frequency, is used herein as meaning the phase of the scan-frequency oscillation at those instants when the double-frequency oscillation rises through zero. Any particular extent of such phase displacement may be validly expressed by either of two values differing by 180° from each other.

The phase displacement between the two said modulation components is a measure of the direction (but not the sense), relative to the receiving aerial system, of displacement of the body from the cone axis of the beam. The amplitude of the scan-frequency modulation component is a measure of the magnitude of this displacement. The received signal therefore contains all the information necessary, for example, to direct the flight of the body towards the cone axis of the beam, provided that means are available to overcome the sense ambiguity.

An oscillator, located at the receiver, operating at sweep-frequency, initially phased by other means with the transmitter scan, and thereafter synchronized by the double-frequency component, provides a means for resolving the ambiguity.

The mathematical expressions for the received signal are as follows:

Let
$\omega$ be the angular velocity of rotation of the plane of polarization of the transmitted beam,
$\xi$ be the angle between the plane of polarization of the receiving aerial system and a fixed reference direction normal to the cone axis of the beam scan,
$\eta$ be the angle between the said reference direction and the direction of the displacement of the flying body from the cone axis,
$\delta = \eta - \xi$
E be the electric field strength,
$m$ be the modulation index corresponding to the displacement.

Then the amplitude of the received pulses is:

$$E\{|+m \cos (\omega t - \eta)\}| \sin (\omega t - \xi)|$$

The expression $\{|+m \cos(\omega t - \eta)\}$ is accurate for small displacements only; if the displacement is large, the expression becomes more complex.

The sweep-frequency component of the expression is:

$$\frac{2}{3\pi}Em\{(3 - \cos 2\delta) \cos (\omega t - \eta) + \sin 2\delta \sin (\omega t - \eta)\}$$

and the double-sweep-frequency component is:

$$-\frac{4}{\pi}E \cos 2(\omega t - \xi)$$

When the invention is applied to the automatic control of the flight of a projectile, so as to tend to bring the direction of flight into coincidence with the cone axis of the scanning beam, it is preferable that the indication of direction of displacement shall be referred to a transverse axis fixed in the projectile. In this case, the information may be applied by either of two principal methods.

In the first method, the body is provided with two independently operable steering mechanisms arranged to correct the direction of flight by turning the body about mutually perpendicular axes, both perpendicular to the longitudinal axis of the body. In the other method, only one such steering mechanism is provided, but mechanism is also provided for twisting the body around its longitudinal axis so as to bring the steering direction into coincidence with the displacement. With either method, the degrees of steering control applied by these two mechanisms are preferably both made to vary in accordance with the amplitude of the modulation component at scan-frequency, but the relative degrees of steering control applied by the two mechanisms are preferably made to vary in accordance with the phase displacement between the modulation components of scan-frequency and of double-scan-frequency.

Figure 2:
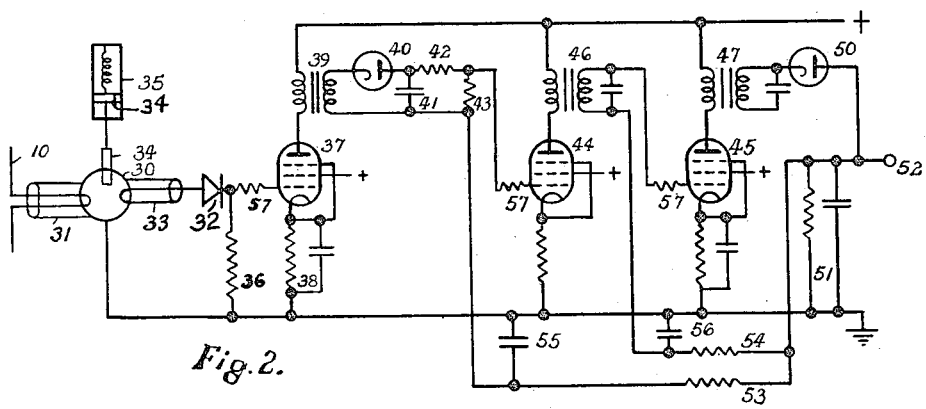
Figure 3:
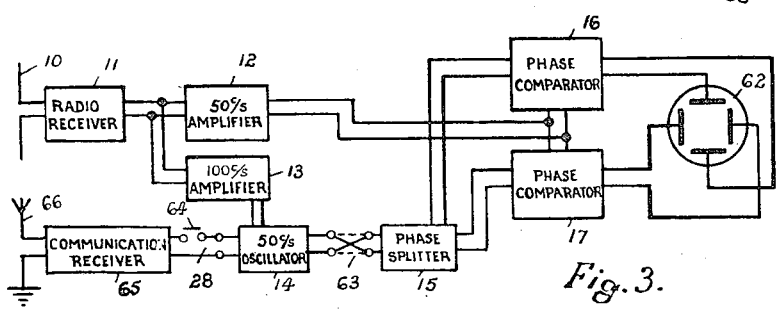

In the accompanying drawings, Figure 1 shows a schematic diagram of an automatic control apparatus to be carried on a projectile; Figure 2 is a circuit diagram of the radio receiver employed in the apparatus of Figure 1; Figure 3 shows a schematic diagram of apparatus for mounting on an aircraft to give information to the pilot; Figure 4 is a partial diagram of a modification of the apparatus represented by Figure 3; Figure 5 is a partial diagram of a further alternative apparatus for mounting on an aircraft; Figure 6 shows one arrangement for transmitting the conical beam for establishing the line of flight; and Figure 7 shows a suitable phase comparator employed in the receiving system.

For the purpose of description with reference to the drawings, the transmitted radio beam will be assumed to consist of a succession of short pulses of radio waves having a frequency of some thousands of megacycles per second. The pulses are of equal amplitude and the pulse repetition frequency is 1500 per second, the duration of each pulse being 1 microsecond. This beam is transmitted from a polarized aerial system, the axis of which rotates at 50 revolutions per second, so that the axis of maximum intensity of the beam scans out a cone of 6° total apical angle. The plane of polarization rotates synchronously with the beam. One suitable arrangement for transmitting the polarized sweeping beam is shown in Figure 6 and involves a dipole antenna DA provided with a reflector R for directing a polarized beam along an axis BA. The antenna-reflector combination is mounted upon a shaft S for rotation about an axis S' inclined to the beam axis BA by three degrees. As the beam rotates about the axis S', the apical angle of the cone of radiation established by the rotating beam will be six degrees. A suitable transmitter for energizing the dipole DA is shown at TR. The antenna and reflector arrangement may be of the type shown in Figure 2 of U. S. patent to Runge 2,083,242.

The beam is such that, in the region of the cone axis of the sweeping beam, the rate of change of field intensity with angle of inclination to the axis of maximum intensity is rapid and approximately linear.

The apparatus diagrammatically shown in Figure 1 is employed for automatic control of the flight of a so-called "unrotating" projectile, that is to say, a projectile which rotates at a speed not exceeding a few tenths of a revolution per second. It will be assumed that the projectile, which may carry a charge of explosive, is to be aimed at a target.

The radio beam will be used for the location of the target by radar methods, and the cone axis of the beam will then itself be moved to follow the target. Alternatively, the beam may be directed at a predicted future position of the target, the prediction being continuously computed on the basis of the residual time of flight from the projectile position to the target.

The projectile is initially projected, from a position near the transmitting aerial system, into the space inside the cone scanned by the beam, as shown at P in Figure 6 and its flight is then controlled by the beam and it will fly within the cone and nearly parallel to the cone axis until it reaches the neighbourhood of the target. A charge of explosive in the projectile is then detonated, for instance by a proximity fuze.

The dipole aerial 10, Figures 1 and 6, is arranged centrally at the rear of the projectile P, perpendicular to the longitudinal axis thereof. The fins, 25, 26, which are operated by servomechanisms 23, 24, are symmetrically arranged on opposite sides of the projectile P near the rear end thereof. In their undeflected attitude, fins 25 and 26 will lie in a plane containing aerial 10 and the longitudinal axis of the projectile.

If fins 25 and 26 are turned in opposite directions, the projectile will be caused to twist about its longitudinal axis. If, however, these fins are both turned in the same direction, they will cause a steering rotation of the projectile about a transverse axis parallel to dipole 10. The term "steering rotation" will be used, with reference to the apparatus shown in Figure 1, solely as referring to rotation about this transverse axis.

Dipole aerial 10 picks up the radio signal, which is then amplified and demodulated in radio receiver 11. The 50 C./S. and 100 C./S. components of the demodulated signal are separated and individually amplified in the 50 C./S. amplifier 12 and the 100 C./S. amplifier 13, respectively. The amplified 100 C./S. signal is employed to synchronize a 50 C./S. oscillator 14. The amplitude of the 50 C./S. signal from amplifier 12 represents the magnitude of the displacement of the centre of dipole 10 from the cone axis of the beam. The phase of this 50 C./S. signal relative to that of the output of synchronized oscillator 14 represents the direction of this displacement. This direction is represented relative to the line along which the dipole 10 lies.

The necessary phase comparison is effected by a pair of phase-comparators 16 and 17 excited with reference voltages in quadrature with each other. These reference voltages are derived from oscillator 14 through quadrature phase-splitter 15.

The amplified 50 C./S. signal from the amplifier 12 is applied as input to both of the phase-comparators 16 and 17, and these comparators then give outputs proportional to those components of the signal from amplifier 12 which are in phase with their respective reference voltage inputs.

The phases of the outputs from phase-splitter 15, which are in quadrature with each other, are so adjusted relative to the phase of the synchronizing signal output from the 100 C./S. amplifier 13, that:

(a) The output from "steer" phase-comparator 16 represents the magnitude of the component, perpendicular to the line along which dipole 10 lies, of the displacement of the centre of the dipole from the axis of the scanned cone, and (b) The output from "twist" phase-comparator 17 represents the magnitude of the component, parallel to the line of dipole 10, of the said displacement.

The output from "twist" phase-comparator 17 is added to the electrical output of a velocity gyroscope 19, which represents the rate of twisting rotation occurring at any instant. The addition is in such sense that the gyroscope output is opposed to the output from the comparator when twisting rotation is already taking place in the sense indicated to be necessary by the output of the comparator. The added outputs from "twist" phase-comparator 17 and "twist" gyroscope 19 are applied to "twist" servo-mechanism 21.

"Steer" gyroscope 18 is another velocity gyroscope, and is arranged to give an electrical output which represents the rate of steering rotation occurring at any instant. The connection of "steer" phase-comparator 16, "steer" gyroscope 18 and "steer" servo-mechanism 20 is generally similar to that of "twist" phase-comparator 17, "twist" gyroscope 19 and "twist" servo-mechanism 21, but a first derivative network 29 is interposed in the output of "steer" phase-comparator 16. The purpose of this network 29 is to add to the output of "steer" phase-comparator 16 a component representing the rate of change of that output, in order to prevent oscillatory behaviour in the direction of steering rotation.

If the projectile achieves a high speed of twisting rotation, the output of "steer" phase-comparator 16, after passing through first derivative network 29, becomes misleading. Contacts 27 are therefore arranged to short-circuit this output when "twist" gyroscope 19 indicates more than a predetermined rate of twist; "steer" servo-mechanism 20 will then respond solely to the output of "steer" gyroscope 18, until the rate of "twist" has been reduced.

By means of a link mechanism 22, the mechanical outputs of servo-mechanisms 20 and 21 are added for application to fin servo-mechanism 23, and subtracted for application to fin servo-mechanism 24.

The initial synchronization of oscillator 14 with the sweep of the transmitter, to avoid sense ambiguity, is effected by injecting at terminals 28 a 50 C./S. synchronizing signal derived from a source in the transmitter which has standardized phase relationship with the transmitter sweep.

It is desirable that the output of 50 C./S. amplifier 12 should be proportional to the actual distance of displacement of the projectile from the cone axis of the beam, rather than to the angular displacement subtended at the transmitter aerial. On the other hand, it is desirable that the output of 100 C./S. amplifier 13 should be reasonably constant at all times.

These results are best achieved by the use of gain control in radio receiver 11 operating automatically to produce an output which is nearly independent of the mean amplitude of the received pulses, and by further gain control operating automatically in 50 C./S. amplifier 12.

The received signal strength, even at extreme range, will always be high, because the beam is sufficiently powerful to be used for radar location of the target, and the projectile operates on the direct, not the reflected, signal. The received signal can therefore be applied to a crystal rectifier without prior amplification.

The variation of strength of the received signal is, however, very wide indeed, because the apparatus is required to work at ranges as short as a few feet from the transmitter.

When signals of excessive amplitude are applied to a crystal rectifier, the modulation becomes distorted. It is therefore necessary to provide means to limit, without distortion of the modulation, the strength of the signals applied to the crystal rectifier. For this purpose, de-tuning of the aerial circuit of the receiver is employed.

The output signal from the crystal rectifier consists of unidirectional pulses of modulated amplitude. These pulses are then lengthened or integrated, and the pulse-repetition-frequency component of the signal (1500 C. P. S.) is extracted and is amplified in an amplifier which is provided with automatic gain control. The amplified signal is finally passed to a detector, whereby the signal representing the modulation of the pulse amplitudes is developed.

Figure 2, which is a circuit diagram of radio receiver 11, shows dipole aerial 10 connected into a tuned cavity 30 by a balanced feeder 31. The output from tuned cavity 30 is applied to a crystal rectifier 32 by means of a concentric feeder 33.

The tuned cavity 30 is provided with a detuning plunger 34, which is controlled by a spring-loaded dash-pot 35. An inertia-operated sear (not shown) is arranged to release plunger 34 at the instant of firing. The dash-pot mechanism is so adjusted that the cavity 30 becomes correctly tuned and the motion of plunger 34 ceases after the projectile has flown 2,000 yards, this being the minimum range at which the crystal rectifier 32 can handle the whole received signal without de-tuning.

The rectified pulse signal developed across resistor 36 is amplified by pentode 37, which is provided with a self-biassing network 38. The output from pentode 37 is applied through transformer 39 to a pulse-lengthening or integrating circuit, which comprises a diode 40 having a load consisting of condenser 41 connected in parallel with resistors 42, 43. The time-constant of this condenser-resistance combination is designed to be $$\frac{1}{2\pi}$$

times the repetition period. A load having this time-constant will develop the maximum repetition-frequency component relative to other components in the signal.

A high amplitude of signal is desirable in the circuit of diode 40, in order that this diode shall operate satisfactorily. The actual value of the signal then developed across the load of diode 40 is, however, too great for direct application as input to the next pentode amplifier 44; the necessary reduction is effected by the potentiometer made up of resistors 42 and 43.

Pentodes 44 and 45 provide a two-stage amplifier of the pulse-repetition-frequency component of the signal. Both of the transformers 46, 47, in the output circuits of these pentodes, are tuned to the pulse repetition frequency.

The output of modulated pulse-repetition-frequency signal from transformer 47 is demodulated by diode 50. The modulation components are developed across diode load 51 and appear between output terminal 52 and earth. The direct component of the output signal is also used to provide automatic gain control on both of valves 44 and 45. The filter networks comprising resistors 53, 54 and condensers 55, 56, which filter the modulation components from the gain control voltages, both have time-constants of value 0.1 second.

Stopper resistors 57 are provided in the grid circuits of each of the valves to prevent parasitic oscillations.

The output between terminal 52 and earth is the output of radio receiver 11, Figure 1.

The 50 C./S. amplifier 12, Figure 1, comprises two pentode amplifier stages. The input is filtered free of 100 C./S. components by a parallel-T network. A further rejector network is included in the output circuit of the first valve of this amplifier to eliminate all components above about 80 C./S.

The first valve of amplifier 12 has a gain control in the form of a variable cathode resistor giving negative feedback. This cathode resistor is variable under the control of the same dashpot 35, Figure 2, which controls the tuning cavity plunger of the aerial input circuit; so that the sensitivity of amplifier 12 increases substantially proportionally to the distance of displacement of the projectile from the axis of the scanned cone instead of to the angular displacement.

The output circuit of amplifier 12 is a transformer tuned to 50 C./S. and having two secondaries which are connected as respective input circuits to phase-comparators 16 and 17.

The 100 C./S. amplifier 13 is a single-stage pentode amplifier having in its input circuit a parallel-T network to reject the 50 C./S. component of the output from radio receiver 11.

The output circuit of this amplifier is a transformer tuned to 100 C./S., the secondary of which is provided with an adjustable phase-shifting network to provide for adjustment of the phase of the synchronizing signal output.

Oscillator 14 is a two-valve resistance-capacity-coupled oscillator designed for a high degree of frequency stability, so that synchronism will not be lost if the synchronizing signal should fail for a second or two.

Phase-comparators 16 and 17 are both of the kind described in co-pending Patent Application Serial No. 582,640, filed March 14, 1945, and corresponding to British Application 6489/44, now United States Patent 2,440,200. The details of comparator 16 according to the above mentioned copending application are shown in Figure 7. In this arrangement the reference voltage from wave-splitter 15 is supplied to a transformer having a center tapped secondary winding 16a, which is bridged by two parallel, oppositely-conducting rectifying paths formed of resistors 16b and 16c connected to opposite sides of the secondary windings through rectifier elements Ra, Rb and Rc, Rd, respectively. One side of the connection from amplifier 12 leads to the center tap of transformer secondary 16a, and the other side is connected to the ends of resistors 16b and 16c through four resistance elements R1, R2, R3 and R4 as shown. The two output connections of the comparator are made to the center tap of resistors 16b and 16c. The reference voltages received from phase-splitter 15 have amplitude at least twice the maximum value of the input voltage from 50 C./S. amplifier 12. The outputs from these phase-comparators are direct voltages, substantially proportional to those components of the output of amplifier 12 which are respectively co-phased with the reference voltages received from phase-splitter 15.

The electrical inputs from gyroscopes 18 and 19 are obtained from potentiometers connected across a steady D. C. source, the tappings of these potentiometers 18a and 19a being adjusted by the gyroscopes in proportion to their precessional displacements from their normal attitudes. The D. C. source for the potentiometers may be earthed, because the outputs from the phase-comparators are free from earth connections.

Servo-mechanisms 20 and 21 comprise electric motors preceded by push-pull direct-coupled pentode amplifiers. The re-setting systems for these servo-mechanisms consist of potentiometers connected across a D. C. source, the outputs of which are applied between stages of the D. C. amplifiers.

The fin servo-mechanisms 23 and 24 comprise oil motors having mechanical re-setting linkages.

One example of the application of the invention having now been described in detail, several alternative applications will now be more briefly described.

It is not essential that the projectile described with reference to Figures 1 and 2 should fly away from the radio beam transmitter. It may, for example, alternatively be used for the destruction of an enemy radar transmitter using a similar beam. It would be launched from an aircraft which had been located by the beam of that transmitter. For this purpose, of course, the dash-pot control of the aerial circuit tuning, and of the sensitivity of amplifier 12, will be modified so as to de-tune the cavity, and to lower the sensitivity, progressively as the signal strength increases.

The problem of initial synchronization to avoid ambiguity may for this purpose be solved by dropping two similar projectiles simultaneously, these being electrically linked by a cable which will easily part. By means of this cable, the output of oscillator 14 of one projectile is applied to synchronize the oscillator 14 of the other in opposite phase; and in turn the output of the oscillator 14 of the latter projectile is returned through the cable to synchronize that of the former projectile in opposite phase. Thus one of the two projectiles must necessarily be correctly phased and will proceed to the transmitter, while the other will be incorrectly phased, and will immediately sheer away from the beam.

Figure 3 is a schematic diagram of an example of an equipment provided on an aircraft, the purpose of which is to present to the pilot the necessary indications to enable him to manoeuvre his aircraft towards the cone axis of a scanning radio beam. This apparatus is particularly applicable, for example, as a blind approach system for leading aircraft down to a landing field on which the beam transmitter is located. The beam is assumed to be identical with that described for use with the apparatus shown in Figure 1.

Dipole aerial 10 will be fixed in the front of the aircraft. Radio receiver 11 may have a circuit identical with that shown in Figure 2, with the exception that the de-tuning plunger 34 will not be required because the range of variation of received signal amplitudes will not be so excessive.

The scan-frequency and double-scan-frequency components of the demodulated output of radio receiver 11 are amplified separately in amplifiers 12 and 13, and the latter is employed to synchronize scan-frequency oscillator 14. The output of oscillator 14 is passed through reversing switch 63 and phase-splitter 15 to provide two reference voltages, in quadrature with each other, for the phase-comparators 16 and 17. These phase-comparators both receive as input voltage the output from sweep-frequency amplifier 12. The apparatus between radio receiver 11 and phase-comparators 16 and 17 is therefore identical with that already described with reference to Figure 1, with the exception of the interposed reversing switch 63.

The outputs of phase-comparators 16 and 17 are applied to the deflector plates of a cathode ray tube 62, so as to produce mutually perpendicular deflections of the spot. The magnitude and direction of the resultant deflection of the spot from the centre of the screen will then represent the magnitude and direction of the displacement of the receiving aerial 10 from the cone axis of the beam.

The phasing of the synchronizing signal from 100 C./S. amplifier 13 relative to the signals from 50 C./S. amplifier 12 will be so adjusted that horizontal and vertical deflections on cathode ray tube 62 respectively represent displacements of the receiving aerial from the cone axis of the beam, along axes, normally horizontal and normally vertical, but fixed in the aircraft.

A direct connection of terminals 28 to an initial synchronization source associated with the transmitter being impossible, the signal for initial synchronization, to resolve the ambiguity, will be transmitted on a separate radio channel and then applied to terminals 28. A receiver 65, which may be the ordinary communication radio receiver on the aircraft, receives this signal from its own aerial 66. The signal so received is applied to terminals 28 by temporary closure of switch 64 at any time when the aircraft is flying nearly level. The initial synchronization signal may conveniently be a 50 C./S. sine-wave modulation of any convenient carrier within the range of the communication receiver.

In case the initial synchronization signal for application to terminals 28 is not available, a method of trial and error may be employed. The pilot, when he has picked up the beam, will make a trial turn and will observe the direction of movement of the cathode ray tube spot. If the sense is incorrect, he will then throw reversing switch 63 to correct it.

Figure 4 is a schematic partial diagram of a modification of the arrangement described with reference to Figure 3. In this modification, dipole aerial 10 is always maintained in a steady attitude relative to the vertical. Then the indications given to the pilot show his truly horizontal and vertical displacements from the cone axis of the beam independently of the attitude of his aircraft, rather than the displacements referred to axes fixed in the aircraft.

In Figure 4, dipole 10 is shown as connected to the input of radio receiver 11 by means of a rotatable feeder joint 61. This joint is mechanically connected to a free gyroscope 60. By this means it is maintained in a steady attitude, e. g. vertical.

From radio receiver 11 to the cathode ray tube 62, the remainder of the circuit is identical with that shown in Figure 3, and is therefore not shown in Figure 4.

In the alternative arrangement of which Figure 5 is a schematic partial diagram, a synchronizing signal transmitted on a separate channel from a separate transmitter associated with the scanning beam transmitter, is used continuously to indicate phase of the beam scan, and not merely as a means for resolving the ambiguity of a double-scan-frequency modulation.

In Figure 5 therefore the 100 C./S. amplifier 13, of earlier figures, is omitted. The signal picked up from the scanning beam by aerial 10 is amplified and demodulated in radio receiver 11, but only the scan-frequency component of the demodulated output is employed. This is amplified in 50 C./S. amplifier 12.

The synchronizing signal, which may be a 50 C./S. sine-wave modulation of a different carrier is picked up by aerial 66 and amplified and demodulated in communication receiver 65, which may be the ordinary communication receiver on the aircraft. The demodulated output of receiver 65 is employed to synchronize 50 C./S. oscillator 14, so that the phase of this oscillator bears constant relationship to the phase of the transmitter scan. The output of oscillator 14 is applied to phase-splitter 15. The remainder of the apparatus, beyond amplifier 12 and phase-splitter 15, is identical with that shown in Figure 3, with the exception that reversing switch 63 is omitted.

The information displayed on the cathode ray tube will represent direction of displacement relative to vertical and horizontal axes which are fixed in the transmitter and are independent of the attitude of the aircraft.

We claim:

1. A system for controlling the direction of flight of a flying body comprising means to transmit a radio beam scanning out in space a cone, the axis of which is the desired line of flight; means to rotate the plane of polarization of said beam, and on said body polarization-sensitive means to receive signals from said beam, position-indicating means responsive to the modulation of the intensity of said signals at any position of the body when displaced from the cone axis to indicate the displacement; twist-indicating means responsive to the relation between components of said modulation at the frequency of said scan and twice the frequency of rotation of the plane of polarization respectively and means responsive to said position- and twist-indicating means to direct the flight of the body towards the axis of the cone.

2. A system for producing in a flying body a response dependent upon the direction of displacement of the body from an axis in space, comprising means to produce a conically scanned radio beam signal, means to rotate the plane of polarization of the signal, and apparatus on the body comprising means to receive said signal, means responsive to amplitude modulation of said received signal at the frequency of conical scan, means responsive to a received signal representing phase of the conical scan, and means responsive to the phase displacement between the conical scan and said amplitude modulation.

3. A system for controlling from a control station the direction of flight of a flying body moving away from or towards the control station, said system comprising at the control station means to produce a radio beam signal of polarized waves, means to scan said beam signal in a conical path about an axis, means to rotate the plane of polarisation of said beam in synchronism with said scan, and apparatus on the flying body comprising means to receive said radio signal, means responsive to the phase displacement between the scan of said beam and the scan-frequency component of amplitude modulation of the angular bearing of said flying body with respect to the cone axis, and means operative in response to said phase responsive means to direct the flight of the body towards the cone axis.

4. A system for producing in a flying body a response dependent upon the direction of displacement of the flying body from an axis, said system comprising means to produce a radio beam signal, means to scan said beam signal in a conical path about said axis and means to rotate the plane of polarization of said signal and, on said body, apparatus comprising polarization-sensitive means to receive said signal, and means to compare the phases of components of amplitude modulation of the received signal at the scan frequency and at double the frequency of rotation of the plane of polarization.

5. A system for producing in a flying body a response dependent upon the direction of displacement of the flying body from an axis, said system comprising means to produce a radio beam signal, means to scan said beam signal in a conical path about said axis, and means to rotate the plane of polarization of said signal in synchronism with said scan and, on said body, apparatus comprising polarization-sensitive means to receive said signal, and means responsive to the phase displacement between the scan-frequency and double-scan-frequency components of amplitude modulation of the received signal.

6. A system for producing in a flying body responses dependent upon the magnitude and upon the direction of displacement of the flying body from an axis, said system comprising means to produce a radio beam signal, means to scan said beam signal in a conical path about said axis, and means to rotate the plane of polarization of said signal in synchronism with said scan and, on said body, apparatus comprising polarization-sensitive means to receive said signal, means responsive to the amplitude of the scan-frequency component of amplitude modulation of the received signal, and means responsive to the phase displacement between the scan-frequency and double-scan-frequency components of amplitude modulation of the received signal.

7. A system for producing in a flying body a response representing the magnitude of a component of the displacement of a flying body from a first axis, the direction of said component being parallel to a second axis fixed in said body, said system comprising means to produce a radio beam signal, means to scan said beam signal in a conical path about said axis, and means to rotate the plane of polarization of said signal in synchronism with said scan and, on said body, apparatus comprising polarization-sensitive means to receive said signal, and means responsive to the amplitude of that component of the scan-frequency component of amplitude modulation of the received signal which bears a fixed phase relationship to the double-scan-frequency component of said modulation.

8. A system for producing a response dependent upon the inclination, relative to the vertical, of the displacement of a flying body from an axis, said system comprising means to produce a radio beam signal, means to scan said beam signal in a conical path about said axis, and means to rotate the plane of polarization of said signal in synchronism with said scan and, on said body, apparatus comprising polarization-sensitive means to receive said signal, means to maintain said polarization-sensitive means in a steady attitude relative to the vertical, and means to compare the phases of components of amplitude modulation of the received signal at the scan-frequency and at double the frequency of rotation of the plane of polarization.

LESLIE HERBERT BEDFORD.
LIONEL JOFEH.

REFERENCES CITED

The following references are of record in the file of this patent:

UNITED STATES PATENTS

| Number | Name | Date |
|---|---|---|
| 1,933,248 | Evans et al. | Oct. 31, 1933 |
| 2,082,347 | Leib et al. | June 1, 1937 |
| 2,083,242 | Runge | June 8, 1937 |
| 2,109,475 | Fanning | Mar. 1, 1938 |
| 2,112,824 | Brown et al. | Apr. 5, 1938 |
| 2,137,241 | Dunmore | Nov. 22, 1938 |
| 2,165,800 | Koch | July 11, 1939 |
| 2,210,651 | Busignies | Apr. 6, 1940 |
| 2,252,699 | Byrne | Aug. 19, 1941 |
| 2,257,320 | Williams | Sept. 30, 1941 |
| 2,260,315 | Halstead | Oct. 28, 1941 |
| 2,417,248 | Godet | Mar. 11, 1947 |
| 2,448,007 | Ayres | Aug. 31, 1948 |